(No Model.)

J. S. MUSGRAVE.
BIRD CAGE.

No. 297,621. Patented Apr. 29, 1884.

WITNESSES:

INVENTOR:
J. S. Musgrave
BY Munn & Co.
ATTORNEYS.

UNITED STATES PATENT OFFICE.

JABEZ S. MUSGRAVE, OF BLOOMFIELD, NEW JERSEY.

BIRD-CAGE.

SPECIFICATION forming part of Letters Patent No. 297,621, dated April 29, 1884.

Application filed August 10, 1883. (No model.)

*To all whom it may concern:*

Be it known that I, JABEZ S. MUSGRAVE, of Bloomfield, in the county of Essex and State of New Jersey, have invented a new and Improved Bird-Cage, of which the following is a full, clear, and exact description.

This invention has for its object to provide bird-cages with a retreat of safety, within which a bird in the cage may take refuge in case of attack by cats or other birds or animals; and to this end the invention consists of an inclosure, made of any suitable material, suspended within or attached to the inside of the cage, the inclosure being so made as to afford quick and easy access thereto for the bird, and perfect protection for the bird in case of attack.

Reference is to be had to the accompanying drawings forming part of this specification, in which similar letters of reference indicate corresponding parts in all the figures.

Figure 1:
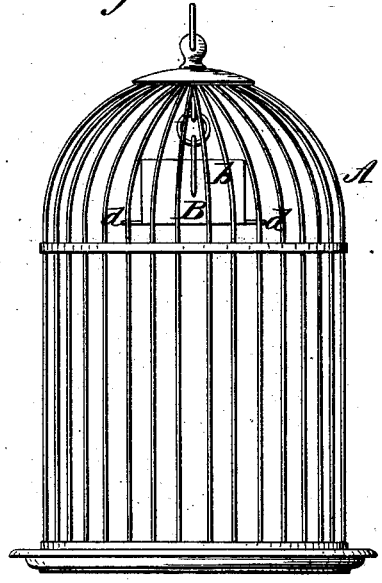
Figure 2:
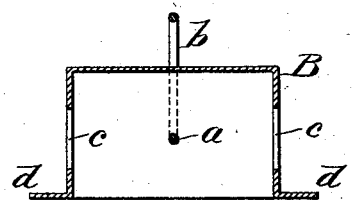
Figure 3:
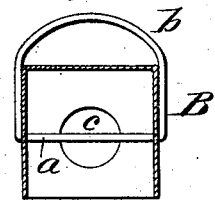

Figure 1 is a side view of a bird-cage having my invention applied thereto. Fig. 2 is a longitudinal sectional elevation of the protecting-inclosure removed from the cage, and Fig. 3 is a transverse sectional elevation of the same.

A represents the bird-cage, which may be of the ordinary or of any approved construction; and B represents the protecting-inclosure, which, in this instance, is provided with the bail $b$, by which the inclosure is suspended from the top of the cage, as shown in Fig. 1. The protecting-inclosure B may be made of wood, sheet metal, wire-gauze, glass, or any other suitable material, and is made open at the bottom, and is provided with the cross-piece $a$, so that the bird confined in the cage can fly from any part of the cage below the inclosure B immediately up within the inclosure and perch itself upon the cross-piece $a$.

In order that the bird may readily enter the protecting-inclosure B from any part of the cage above the bottom of the inclosure B, I form the sides or ends of the inclosure with the entrance-openings $c\,c$, and with the flanges $d\,d$ under the holes $c\,c$, so that the bird can either fly immediately through one or other of the openings $c$ into the inclosure B or first light upon one or other of the flanges $d$, and then enter the inclosure B through one or other of the openings $c$. Constructed in this manner, with open bottom and end or side openings, it will be seen that ready access to the inclosure B is afforded for the bird, no matter what part of the cage he may happen to be in at the time of attack; and it will also be seen that the inclosure B furnishes perfect protection for the bird in case of attack by a cat or other animal or bird.

Instead of adapting the inclosure B to be suspended from the top of the cage, as shown, it might be made to be attached or clamped to the wires of the cage inside of the cage, and instead of forming the inclosure with two entrance-openings, $c$, and two flanges, $d$, it might be made with one or more of these and not depart from the spirit of my invention.

Having thus described my invention, I claim as new and desire to secure by Letters Patent—

1. The safety-inclosure B, for bird-cages, having an open bottom and provided with side openings, a perch, and means for securing it in a cage above the bottom of the same, substantially as herein shown and described.

2. The combination, with a bird-cage, of the open-bottom inclosure B, provided with perch $a$, bail $b$, openings $c$, and flanges $d$, substantially as herein shown and described.

3. The safety-inclosure B, for bird-cages, made open at the bottom and provided with a perch, and formed with the openings $c$ and flanges $d$, substantially as and for the purposes set forth.

JABEZ S. MUSGRAVE.

Witnesses:
H. A. WEST,
C. SEDGWICK.